(12) United States Patent
Lopez et al.

(10) Patent No.: US 12,735,209 B1
(45) Date of Patent: Sep. 15, 2026

(54) UNMANNED AERIAL VEHICLE (UAV) SYSTEM INCLUDING FIELD-PORTABLE HOUSING WITH INTERNAL CHAMBERS AND RELATED METHODS

(71) Applicant: Eagle Technology, LLC, Melbourne, FL (US)

(72) Inventors: David Lopez, Malabar, FL (US); Hugh McFadden, Indialantic, FL (US); James Cornett, Lago Vista, TX (US); Bruce Yancy, Grant, FL (US); Randy Bolling, Odessa, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 19/192,229

(22) Filed: Apr. 28, 2025

(51) Int. Cl.

| | |
|---|---|
| ***B64U 70/50*** | (2023.01) |
| ***B64U 70/70*** | (2023.01) |
| ***B64U 70/92*** | (2023.01) |
| ***B64U 80/25*** | (2023.01) |

(52) U.S. Cl.
CPC ............. *B64U 70/50* (2023.01); *B64U 70/70* (2023.01); *B64U 70/92* (2023.01); *B64U 80/25* (2023.01)

(58) Field of Classification Search
CPC ........ B64U 70/50; B64U 70/70; B64U 70/92; B64U 80/25
See application file for complete search history.

(56) References Cited

U.S. PATENT DOCUMENTS

| | | | | |
|---|---|---|---|---|
| 4,255,911 | A * | 3/1981 | Beacom | E04H 6/00 52/174 |
| 4,478,379 | A * | 10/1984 | Kerr | B64U 10/13 244/17.11 |
| 7,789,341 | B2 * | 9/2010 | Arlton | B64U 30/21 244/6 |
| 8,083,173 | B2 * | 12/2011 | Arlton | B64U 50/19 244/17.23 |
| 8,146,854 | B2 * | 4/2012 | Lawrence | B64U 40/10 244/17.23 |
| 8,888,551 | B2 * | 11/2014 | Xu | A63H 27/12 244/17.23 |
| 9,540,121 | B2 * | 1/2017 | Byers | G06Q 10/0832 |
| 9,573,683 | B2 * | 2/2017 | Martin | B64C 27/50 |
| 11,180,253 | B1 * | 11/2021 | Seeley | B64U 60/50 |
| 11,292,595 | B2 * | 4/2022 | Meringer | B64U 50/19 |

(Continued)

OTHER PUBLICATIONS

Wolf Advanced Technology; "Lightweight & Modular Coaxial Drone for Public Safety, Emergency Response &Disaster Relief;" Information on Coaxial Drone, Modular Backpack Drone, and Ascent Aerosystems—website: https://www.unmannedsystemstechnology.com/company/ascent-aerosystems/ 2024; 14 pages.

*Primary Examiner* — Medhat Badawi
(74) *Attorney, Agent, or Firm* — ALLEN, DYER, DOPPELT, + GILCHRIST, P.A. Attorneys at Law

(57) ABSTRACT

An unmanned aerial vehicle (UAV) system may include UAVs. Each UAV may include a body and at least one deployable blade coupled thereto. The UAV system may also include a field-portable housing having internal chambers receiving respective UAVs therein, and elevators carried by the field-portable housing and associated with respective internal chambers. Each elevator may be configured to move a respective UAV between lowered and raised positions.

20 Claims, 11 Drawing Sheets

(56) References Cited

U.S. PATENT DOCUMENTS 11,492,114 B1 * 11/2022 Filipovic .................. G08G 5/22
11,524,766 B2 * 12/2022 Campbell ............... B64C 11/48
11,649,051 B2 * 5/2023 Arlton .................... B64U 30/21
244/17.23
11,776,136 B1 * 10/2023 Pachikov ............... B64U 10/13
244/17.23
11,840,329 B1 * 12/2023 Hinman ................. B64U 50/19
12,054,252 B2 * 8/2024 Warner, IV ............. B64C 27/39
12,110,138 B2 * 10/2024 Deng ..................... B64U 50/19
12,131,656 B2 * 10/2024 Raptopoulos .......... G05D 1/695
12,162,635 B2 * 12/2024 Lowe ..................... B64U 70/50
12,168,533 B1 * 12/2024 Hinman ................. B64U 70/97
12,240,633 B2 * 3/2025 Arlton .................... B64U 10/13
12,344,411 B1 * 7/2025 Schmidt ................. B64U 70/92
12,391,414 B2 * 8/2025 Qiu ........................ B64U 80/70
12,391,415 B1 * 8/2025 John ...................... B64U 70/97
12,409,949 B2 * 9/2025 Kozlenko .............. G05D 1/244
12,409,958 B2 * 9/2025 Alghanmi .............. B64U 60/50
2005/0051667 A1 * 3/2005 Arlton .............. G08B 13/19621
244/17.11
2009/0081043 A1 * 3/2009 Jones .................... B64C 27/022
416/143
2010/0012774 A1 * 1/2010 Fanucci ................ F42B 12/365
244/49
2011/0155840 A1 * 6/2011 Lind, Jr. ................ B64U 30/12
244/17.11
2016/0167778 A1 * 6/2016 Meringer ............... B64U 30/24
244/17.11
2016/0364989 A1 * 12/2016 Speasl ...................... G08G 5/57
2017/0021923 A1 * 1/2017 Fisher .................... B64U 70/97
2017/0283042 A1 * 10/2017 Gamble ................. B64U 30/24
2017/0284371 A1 * 10/2017 Gamble .................. F03D 17/00
2017/0320565 A1 * 11/2017 Gamble .................. B64C 17/04
2017/0320572 A1 * 11/2017 High .................... G05D 1/0011
2018/0118340 A1 * 5/2018 Russo .................... B64U 50/37
2018/0290764 A1 * 10/2018 Mcmillian ............. B64U 70/90
2019/0023416 A1 * 1/2019 Borko ..................... G06F 3/041
2019/0135433 A1 * 5/2019 Goovaerts .............. A47G 29/14
2019/0322368 A1 * 10/2019 Melcher ................. B64U 50/15
2020/0003529 A1 * 1/2020 Benezra ................. B64U 80/70
2020/0199990 A1 * 6/2020 Friesen ............. B01F 35/71705
2020/0349852 A1 * 11/2020 DiCosola ................. G08G 5/55
2021/0107684 A1 * 4/2021 Le Lann ................... B64F 1/26
2021/0197983 A1 * 7/2021 Wang ..................... B64U 80/10
2021/0405655 A1 * 12/2021 Yi .......................... B64U 70/90
2022/0026397 A1 * 1/2022 Kamel ................. G01N 29/225
2022/0306320 A1 * 9/2022 Howe .................. B64U 30/299
2024/0076072 A1 * 3/2024 Arii ........................ B64U 30/20
2024/0132238 A1 * 4/2024 Qiu ........................ B64U 70/92
2024/0150036 A1 * 5/2024 Kozlenko .............. B64D 45/08
2025/0011017 A1 * 1/2025 Kim ....................... B64U 70/90
2025/0026509 A1 * 1/2025 Infanti ................... B64U 70/50
2025/0058714 A1 * 2/2025 Panigrahi ............... B64U 80/86
2025/0108935 A1 * 4/2025 Johnson .................. B60L 53/22
2025/0121966 A1 * 4/2025 Gronstedt .............. B64U 80/70

* cited by examiner

UNMANNED AERIAL VEHICLE (UAV) SYSTEM INCLUDING FIELD-PORTABLE HOUSING WITH INTERNAL CHAMBERS AND RELATED METHODS

TECHNICAL FIELD

The present invention relates to the field of vehicles, and, more particularly, to unmanned aerial vehicles and related methods.

BACKGROUND

An unmanned aerial vehicle (UAV), which may be referred to as a drone, is an aircraft with no human pilot, crew, or passengers onboard the aircraft. A UAV may be particularly useful for aerial photography, agriculture, weather observation, aerial inspections, and product deliveries, for example.

A UAV may come in different sizes and forms. For example, one type of drone may have a vertical form factor and may be known as a vertically-profiled coaxial drone and may include a cylindrical body and blades that rotate about the cylindrical body. Another type of UAV may be a quadcopter UAV that includes a body and four arms extending outwardly from the body. Blades that rotate are carried by a distal end of each of the four arms.

A UAV may be deployed from any number of locations, for example, based upon the form factor. For example, a UAV may deploy or take off from an airport similarly to an airplane. Another type of smaller UAV may deploy from any ground-based location, such as, for example, when the UAV can perform a vertical takeoff and landing. Another UAV may be deployed from dock, for example, a portable dock that may be positioned in a desired location.

SUMMARY

An unmanned aerial vehicle (UAV) system may include a plurality of UAVs. Each UAV may include a body and at least one deployable blade coupled thereto. The UAV system may include a field-portable housing having a plurality of internal chambers receiving respective UAVs therein. The UAV system may further include a plurality of elevators carried by the field-portable housing and associated with respective internal chambers, each elevator may be configured to move a respective UAV between lowered and raised positions.

The UAV system may include a controller carried by the field-portable housing to selectively operate the plurality of elevators for UAV launching and recovery. The controller may be configured to communicate a desired internal chamber to a respective UAV during UAV recovery, for example.

The system may also include a wireless transceiver, and the controller may be configured to cooperate with the wireless transceiver for remote wireless communication. The UAV system may include an electrical charging arrangement carried by the field-portable housing for charging the plurality of UAVs, for example.

The UAV system may include a cooling arrangement carried by the field-portable housing for cooling the plurality of UAVs. The UAV system may include a plurality of UAV presence detectors, each associated with a respective internal chamber, for example.

Each elevator may include a rail, a capture cup movable along the rail and for receiving a respective UAV, and an actuator for moving the capture cup along the rail, for example. The UAV system may include a plurality of tubular silos carried by the field-portable housing and defining the plurality of internal chambers.

A method aspect is directed to a method of operating a plurality of unmanned aerial vehicles (UAVs), with each UAV including a body and at least one deployable blade coupled thereto. The method may include storing the plurality of UAVs in a field-portable housing having a plurality of internal chambers receiving respective ones of a plurality of UAVs therein; and operating a plurality of elevators associated with respective internal chambers within the field-portable housing to move respective UAVs between lowered and raised positions.

The method may also include using a controller carried by the field-portable housing to selectively operate the plurality of elevators for UAV launching and recovery. Using the controller may include using the controller to communicate a desired internal chamber to a respective UAV during UAV recovery, for example. Using the controller may include using a wireless transceiver cooperating with the controller for remote wireless communication, for example.

The method may include using an electrical charging arrangement carried by the field-portable housing for charging the plurality of UAVs. The method may also include using a cooling arrangement carried by the field-portable housing for cooling the plurality of UAVs, for example.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternative embodiments.

Figure 1:
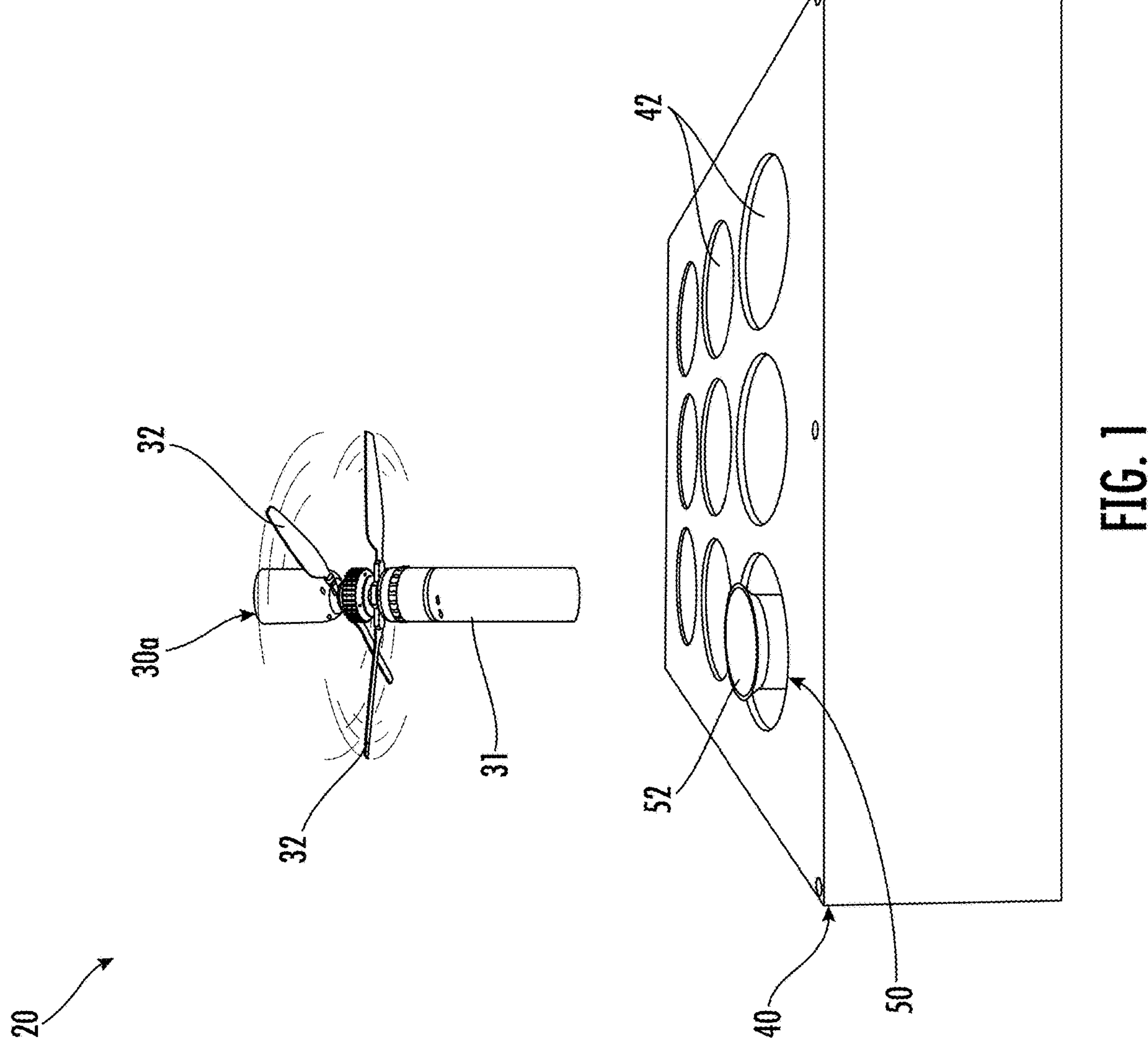
FIG. 1 is a perspective view of a UAV system in accordance with an embodiment.
Figure 2:
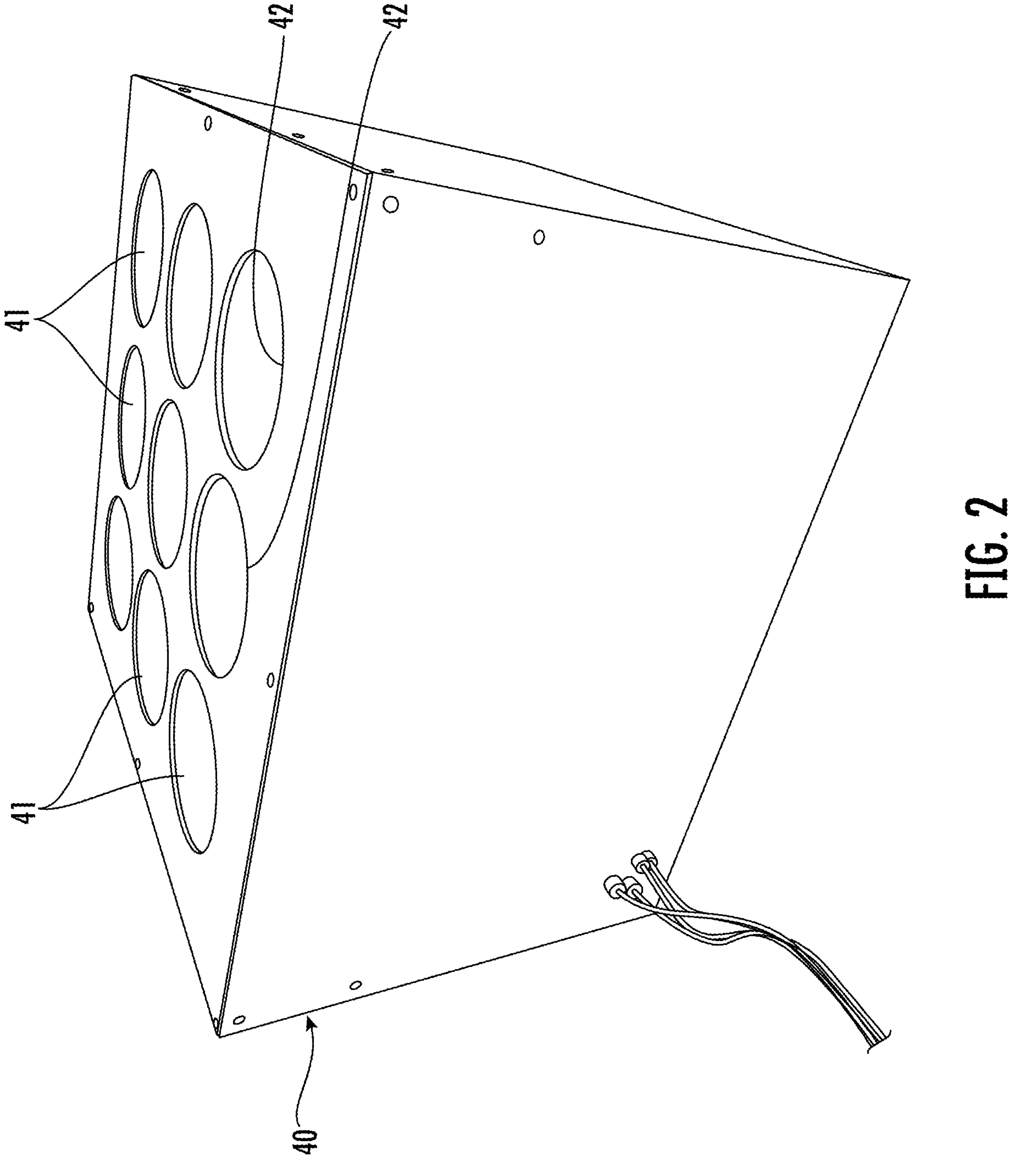
FIG. 2 is a perspective view of a field-portable housing of the UAV system of FIG. 1.
Figure 3:
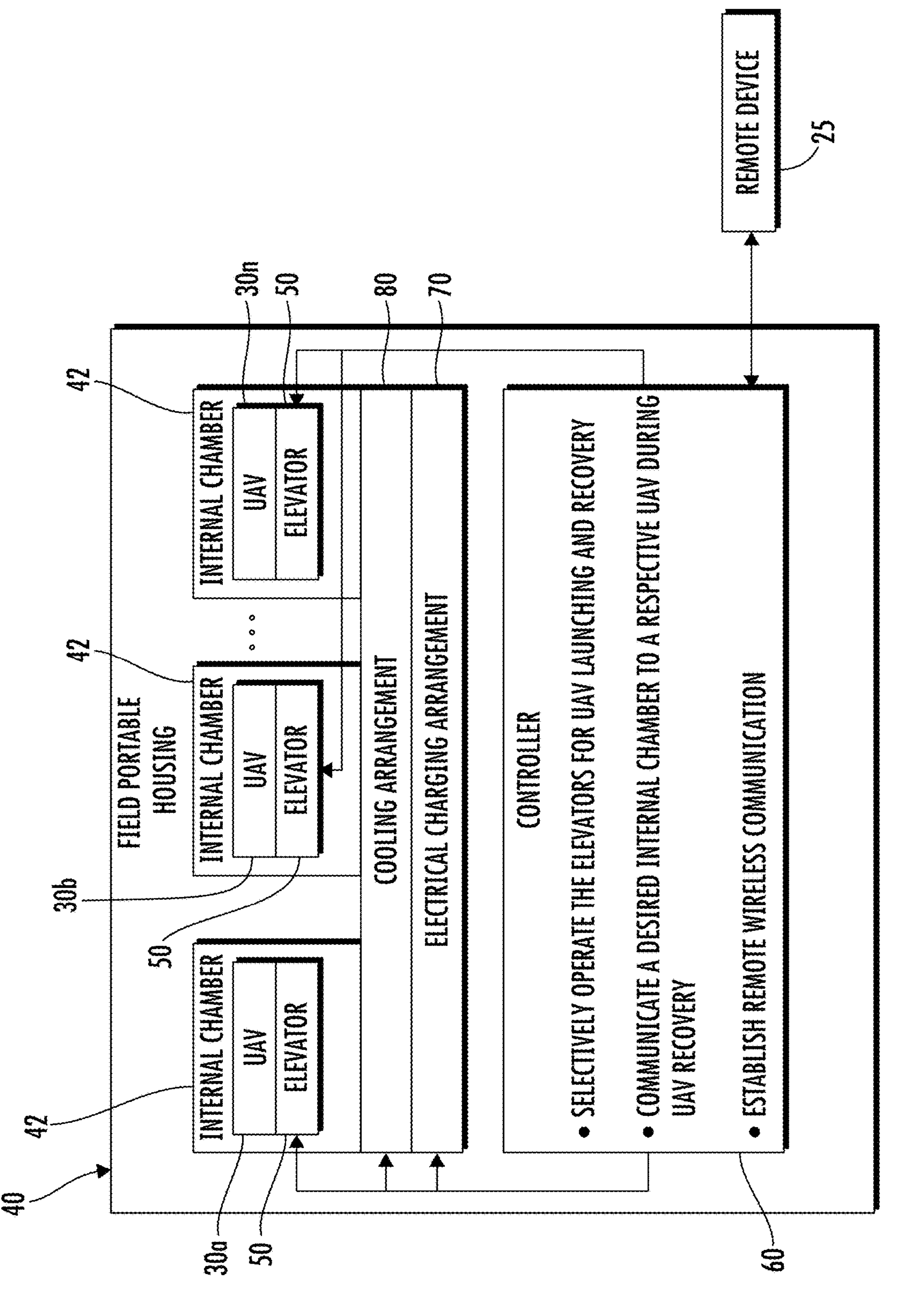
FIG. 3 is a schematic block diagram of UAV system of FIG. 1.

Referring initially to FIGS. 1-3, an unmanned aerial vehicle (UAV) system 20 includes UAVs 30*a*-30*n*. Each UAV 30*a*-30*n* is in the form of a vertically-profiled coaxial drone. More particularly, each UAV 30*a*-30*n* has a body 31 having a cylindrical shape and centrally mounted deployable blades 32 coupled to the body. The deployable blades 32 may be foldable, for example, upwardly, as described herein. In other embodiments, however, the blades 32 may be foldable downwardly. The UAVs 30*a*-30*n* may carry a payload both at the top end or bottom end of the body 31. An exemplary coaxial UAV 30*a*-30*n* may be the Spirit™ or NX30 UAVs available from Ascent AeroSystems of Wilmington, Massachusetts.

The UAV system 20 also includes a field-portable housing 40. The field-portable housing 40 may be sized to be carried by a land-based vehicle to a desired location. The field-portable housing 40 may have rails on a bottom thereof to facilitate transport, as will be appreciated by those skilled in the art.

The field-portable housing 40 has internal chambers 42 for receiving respective UAVs therein. The internal chambers 42 are defined by tubular silos 41. Illustratively there are nine internal chambers 42 defined by nine tubular silos 41. However, there may be any number of internal chambers 42 or tubular silos 41. An upper end of each tubular silo 41 may be flared or have a funnel-shape, such as to facilitate recovery or returning of the UAVs 30*a*-30*n*.

Figure 4:
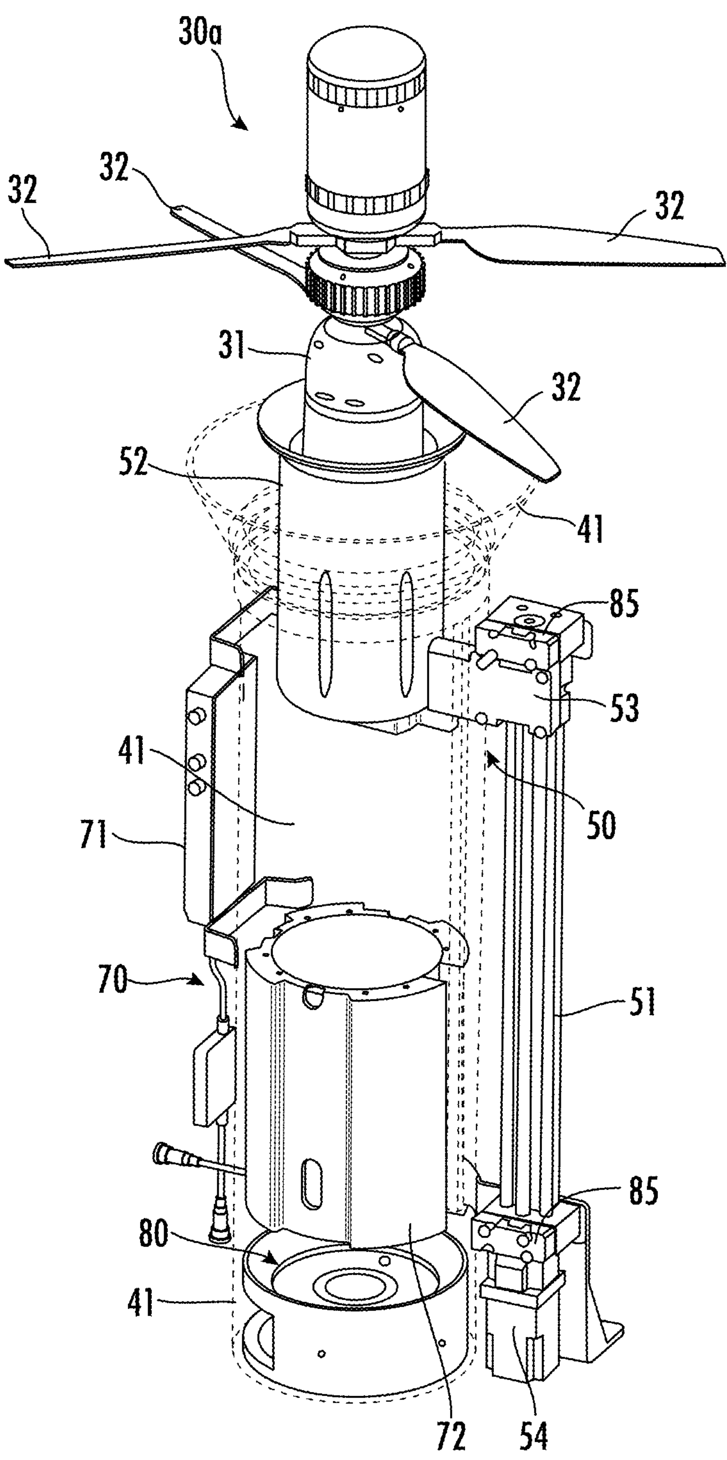
FIG. 4 is a partial cut away view of a tubular silo of the UAV system of FIG. 1 illustrating a UAV and associated elevator in the raised position.
Figure 5:
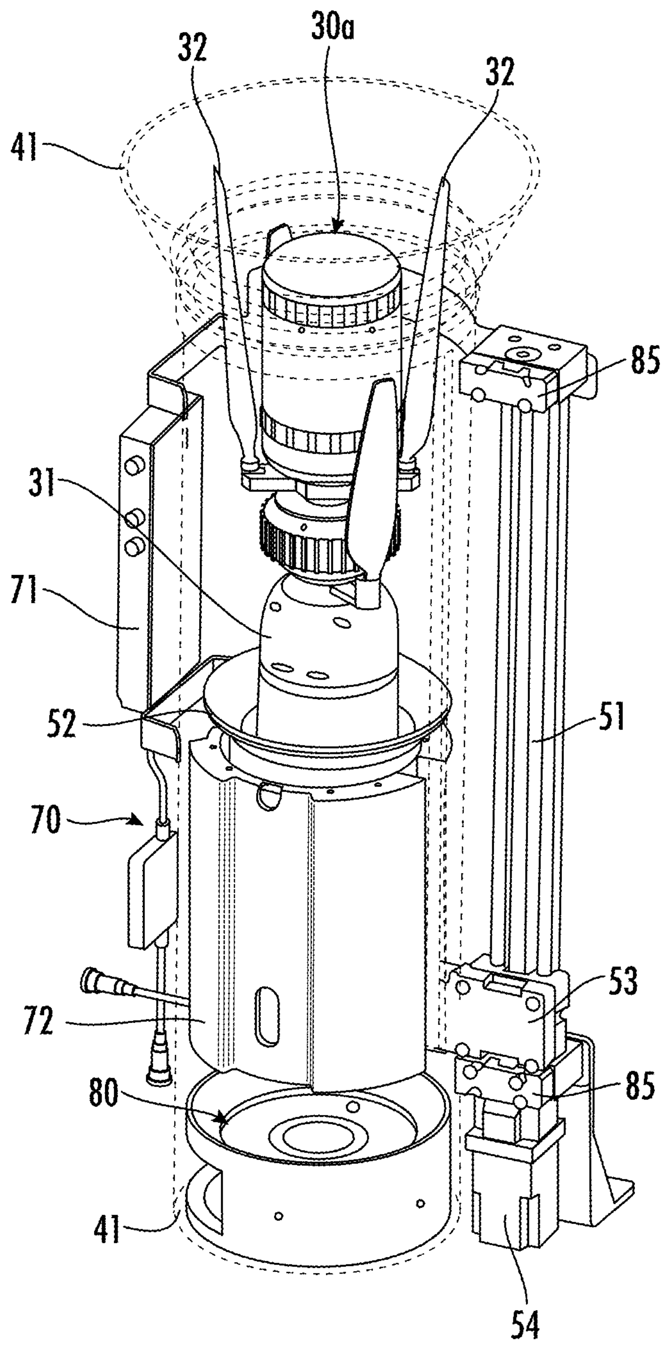
FIG. 5 is a partial cut away view of a tubular silo of the UAV system of FIG. 1 illustrating a UAV and associated elevator in the lowered position.
Figure 6:
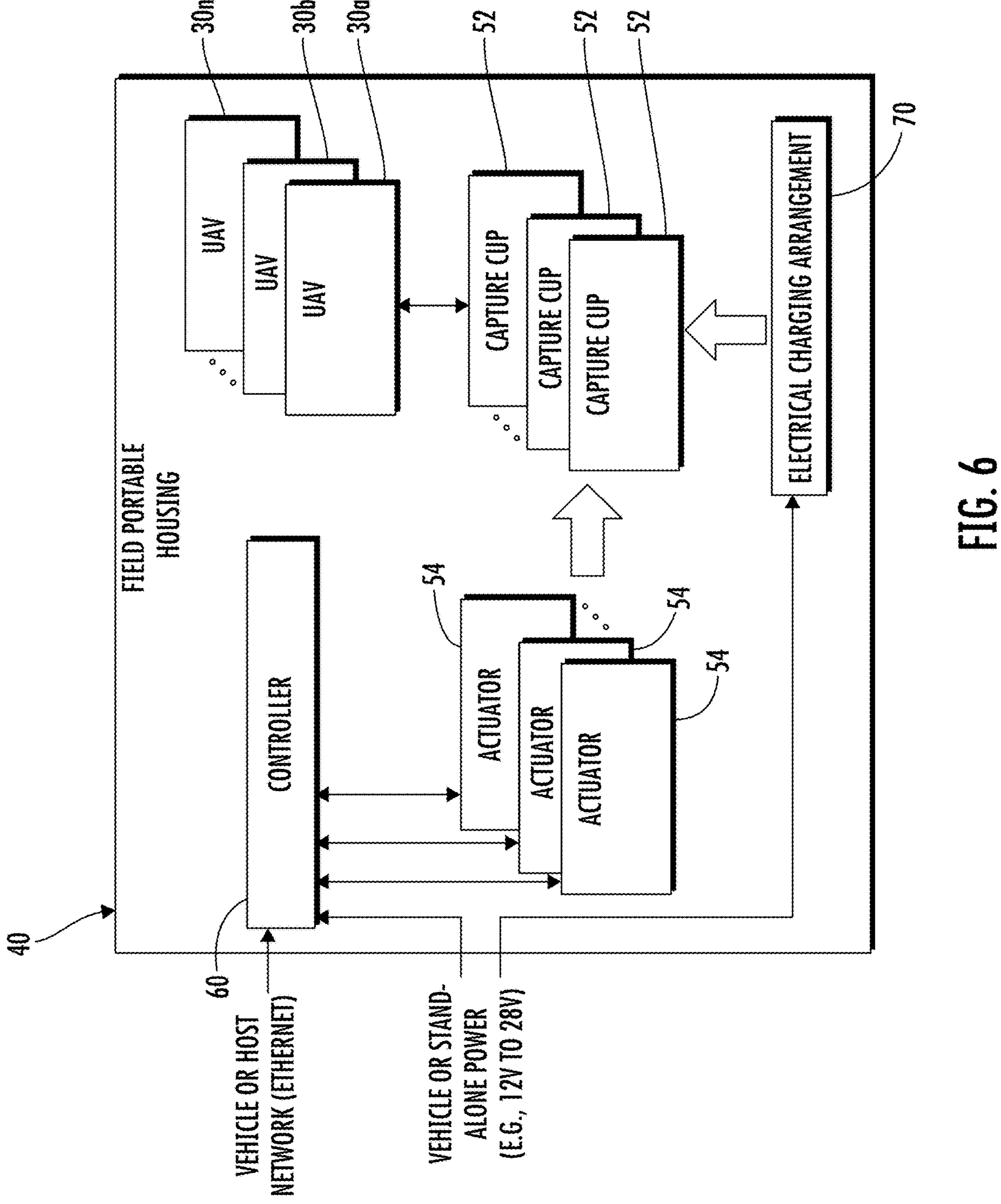
FIG. 6 is another schematic block diagram of a portion of the UAV system of FIG. 1.

Referring additionally to FIGS. 4-6, the UAV system 20 also includes elevators 50 carried by the field-portable housing 40. The elevators 50 are associated with respective internal chambers 42. Each elevator 50 moves a respective UAV 30*a*-30*n* between lowered and raised positions as will be described in further detail below.

Each elevator 50 illustratively includes a rail 51 and a capture cup 52 movable along the rail for receiving a respective UAV 30*a*-30*n*. The rail 51 extends along a length of tubular silo 41. The capture cup 52 is positioned within the tubular silo 41. The capture cup 52 is coupled to the rail 51 via a shuttle 53. An actuator 54, for example, a motor at the bottom of the rail 51, operates to move the shuttle 53 and thus the capture cup 52 along the rail between the lowered and raised positions. For example, the rail 51 may include a screw-drive driven by the actuator 54 to move the shuttle 53 along the rail. In some embodiments, the actuator 54 may be carried by the shuttle 53. A slot in the tubular silo 41 permits the shuttle 53 to move between the lowered and raised positions.

A controller 60 is carried by the field-portable housing 40. The controller 60 is coupled to the elevators 50 and selectively operates the elevators for UAV launching and recovery. For example, for deployment or launching, the controller 60 may operate the actuator so that the shuttle 53 and capture cup 52 move upwardly, along the rail, so that the respective UAV 30*a*-30*n* is able to deploy from the internal chamber 42. In other words, the UAV 30*a*-30*n* is raised from the internal chamber 42 so that the blades 32, upon deployment, clear the field-deployable housing 40 and are able to freely rotate. During recovery, for example, the capture cup 52 may be in the raised position to allow the UAV 30*a*-30*n* to land on the capture cup. Upon landing and shutdown of the blade rotation, the blades 32 may retract or fold upwardly permitting the capture cup 52 to be lowered to the lowered position.

The controller 60 may also communicate, for example, via wireless communications circuitry, a desired internal chamber 42 to a respective UAV during UAV recovery. More particularly, each internal chamber 42 or tubular silo 41 may have a unique identifier associated therewith. The unique identifier may be a number (e.g., chamber 1, 2, etc.) or geographic coordinates, for example, GPS coordinates. Each internal chamber 42 may alternatively or additionally be identified using radio frequency identifier (RFID) tags or RFID technology. The controller 60 may communicate, for example, wirelessly, the unique chamber identifier or desired internal chamber 42 to a respective UAV 30*a*-30*n* during recovery, for example, when the UAV is traveling back to the field-portable housing 40 or within a threshold distance of the field-portable housing during recovery.

The UAV 30*a*-30*n* may receive the desired internal chamber 42 at any time. In some embodiments, the desired internal chamber 42 may be communicated to the respective UAV 30*a*-30*n* when the UAV is docked in the internal chamber (e.g., in the lowered position), or during movement to the raised position, for example. The desired internal chamber 42 may be the internal chamber that the respective UAV 30*a*-30*n* is currently within, for example, such that the respective UAV returns to the same internal chamber 42 as deployment.

The controller 60 may also establish remote communication with a remote device 25 (FIG. 3). The remote device 25 may be a remote computer or controller that communicates data (e.g., wired or wirelessly) related to the condition and operations of the elevators 50 and/or data relating to the UAVs 30*a*-30*n*. For example, the UAVs may communicate with the controller 60, and the controller may communicate that information (e.g., position, health, and payload data) to the remote device 25—acting as a relay. In an embodiment, the UAVs 30*a*-30*n* may communicate directly with the remote device 25.

The controller 60 may cooperate with other hardware or devices within the field-portable housing 40. For example, the UAV system 20 may also include an electrical charging arrangement 70 carried by the field-portable housing 40. The electrical charging arrangement 70 may include wireless charging components. For example, the electrical charging arrangement 70 may include a wireless charging controller 71 coupled to a wireless charging antenna 72. The wireless charging controller 71 may be mounted or secured to an outside surface of a respective tubular silo 41 within the field-portable housing. The wireless charging antenna 72 may surround the capture cup 52 so that the UAV 30*a*-30*n* (i.e., the UAV power source), when carried by the capture cup within the internal chamber 42 and in the tubular silo 41, is charged, for example, inductively. In another embodiment, each UAV 30*a*-30*n* may be charged or have its power source charged via a wired connection (i.e., conductive), as will be described in further detail below.

The UAV system 20 also includes a cooling arrangement 80 carried by the field-portable housing 40 for cooling the UAVs 30*a*-30*n*. The cooling arrangement 80 is illustratively in the form of a cooling fan carried at the bottom of the tubular silo 41 such that hot air, for example, generated by the UAVs 30*a*-30*n* may be extracted from the tubular silo or relatively cool air may be injected into the tubular silo. The cooling arrangement 80 may include other and/or additional cooling elements or implement various cooling techniques, for example, including a heat sink.

The UAV system 20 also includes UAV presence detectors 85 (FIGS. 4-5). The UAV presence detectors 85 may include pogo-pins such that as the shuttle 53 reaches the lowered or raised positions, the shuttle makes electrical contact with the respective UAV presence detectors 85 to detect the position or presence of the capture cup 52, and thus the associated UAV 30*a*-30*n*. The UAV presence detector 85 may be in the form of other and/or additional element or implement other detection techniques, for example, optical position sensing, pressure sensors (e.g., within the capture cup 52), etc.

Figure 7:
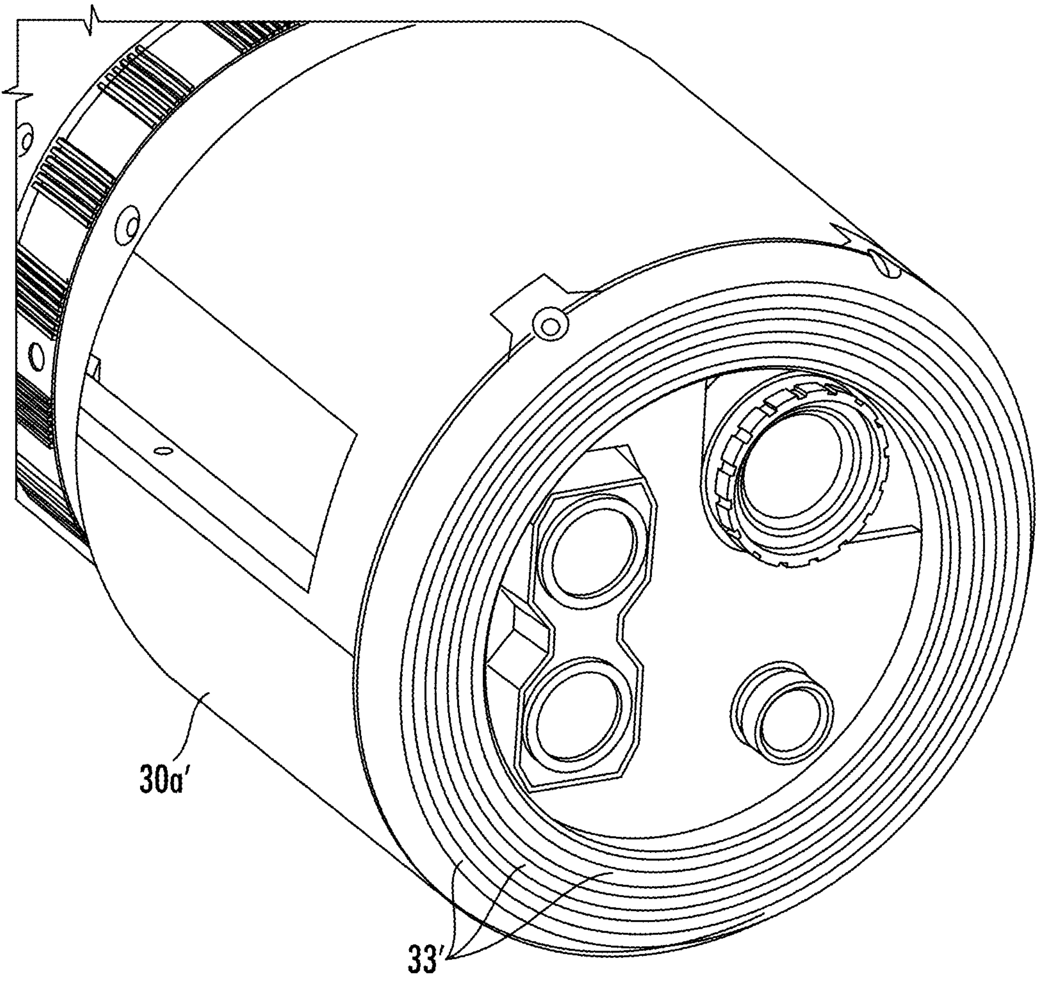
FIG. 7 is a perspective view of a portion of a UAV in accordance with another embodiment.
Figure 8:
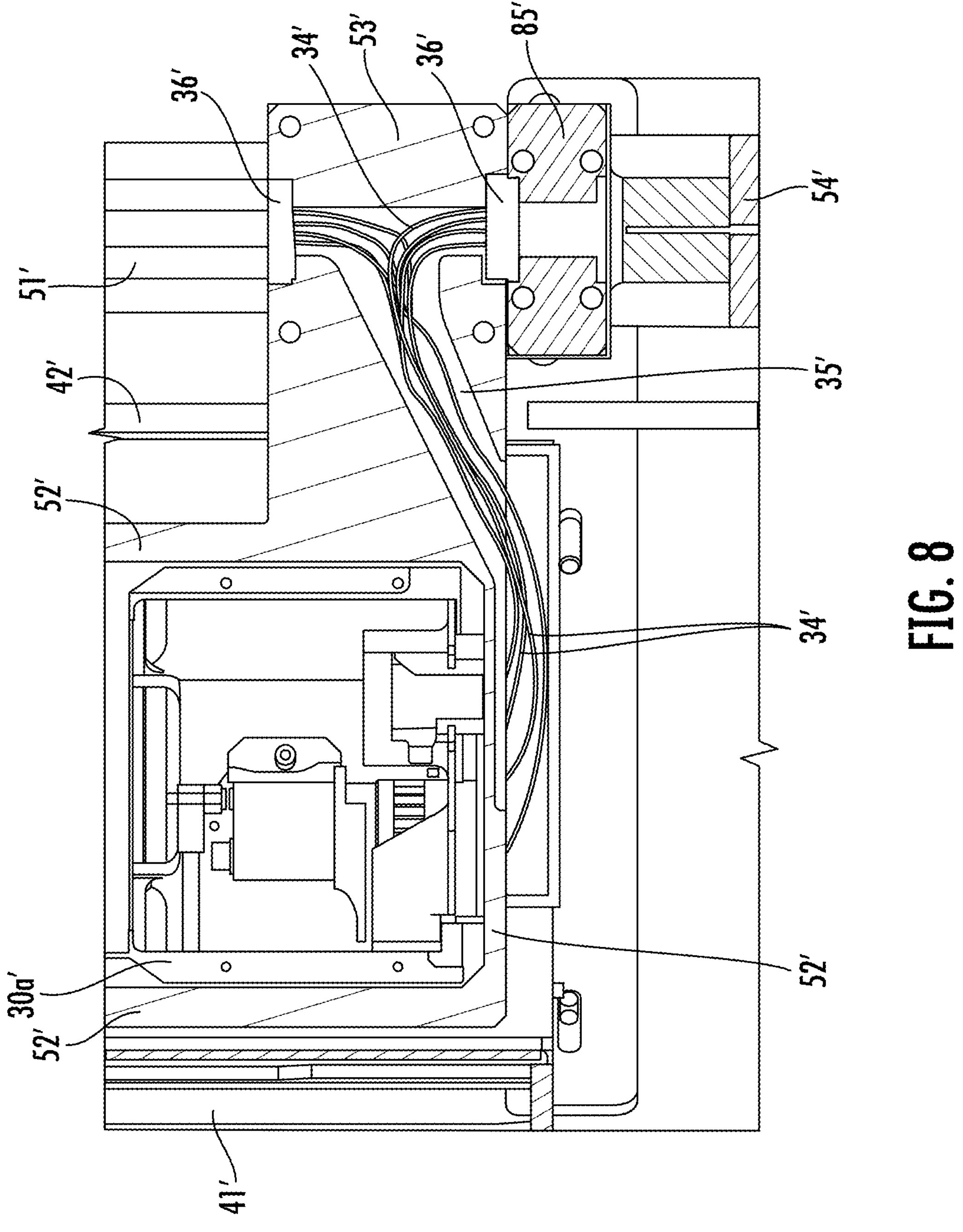
FIG. 8 is a partial cut away view of an elevator and the UAV of FIG. 7.

Referring briefly to FIGS. 7-8, in another embodiment, as noted above, each UAV may be charged or detected by using wired techniques. Each UAV 30*a*' includes a series of electrically conductive rings 33' (e.g., concentric). The electrically conductive rings 33' may mate with rings or electrical connectors carried in the base or bottom of the capture cup 52'. Electrical connectors or wires 34' may couple, via a conduit 35' in the shuttle 53', to the pogo-pins 36', which, as illustrated, couple to a lower one of the UAV detectors 85' to perform the UAV detection and/or wired charging functions. Other elements illustrated, but not specifically described, for example, the tubular silo 41', internal chamber 42', rail 51' and actuator 54' are similar to the tubular silo 41, internal chamber 42, rail 51, and actuator 54 above.

Figure 9:
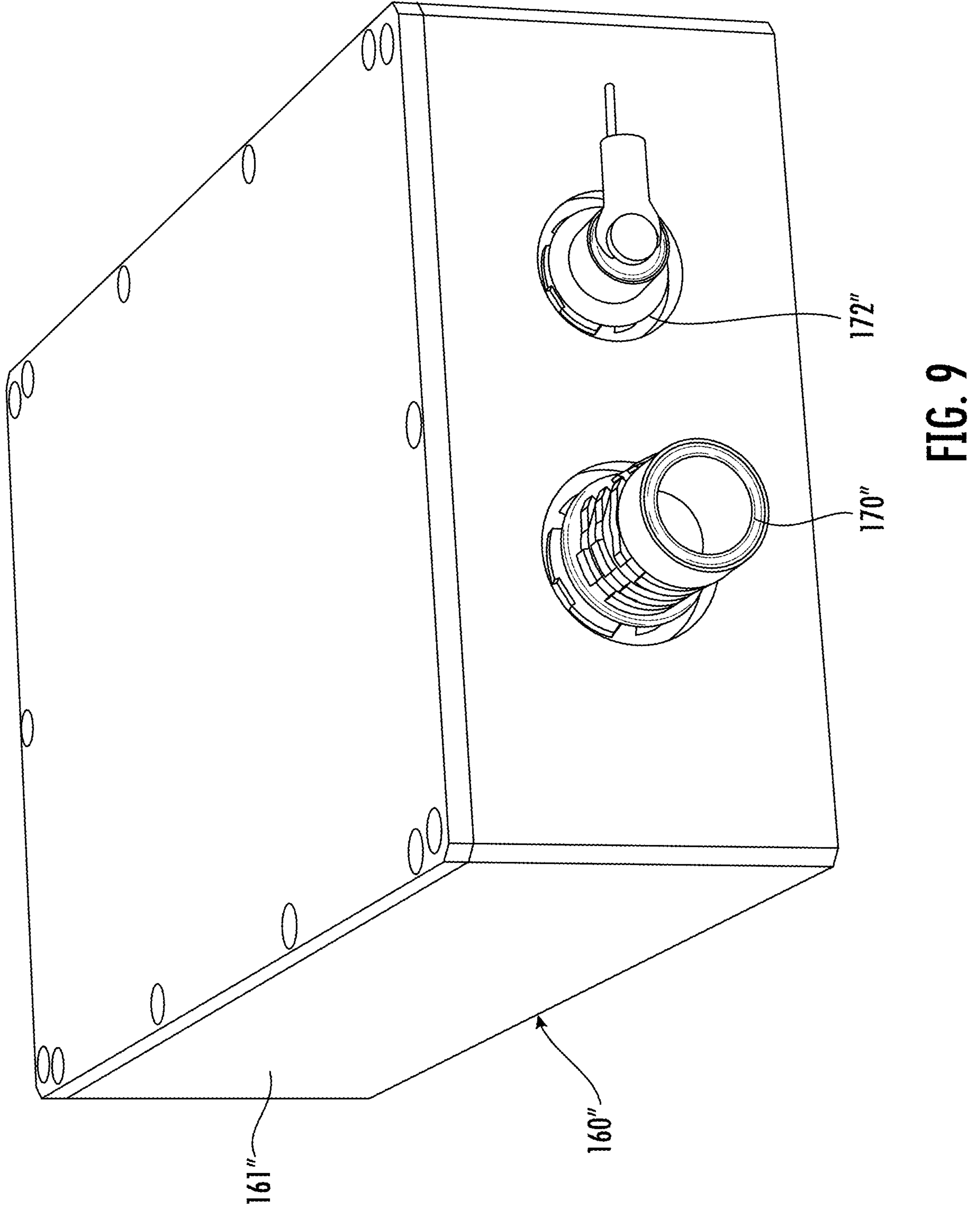
FIG. 9 is a perspective view of an elevator control module (ECM) in accordance with an embodiment.
Figure 10:
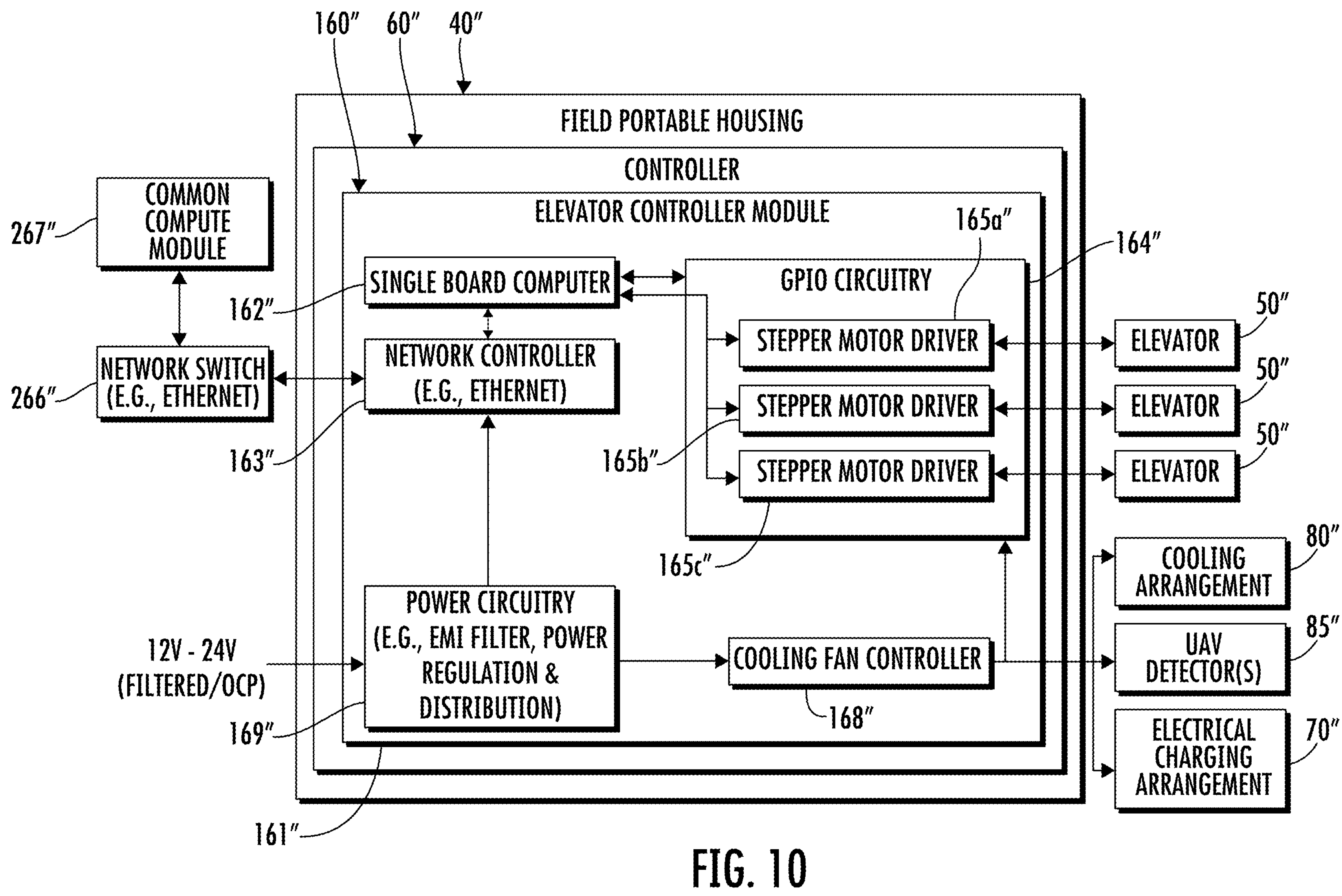
FIG. 10 is a schematic block diagram of the ECM of the FIG. 9.

While a controller 60 has been described herein, it should be understood by those skilled in the art that the functions or operations of the controller may be distributed among different circuitry and different housings, as will be described in further detail below. Referring now to FIGS. 9-10, for example, in an exemplary implementation, the controller 60" may include an elevator controller module (ECM) 160" and a communication, computation, control, and power control module (C3PCM) 260' '.

The ECM 160" may include a housing 161" that is carried within the field-portable housing 40". The housing 161" may be considered a universal housing or chassis accommodating a relatively wide range of clamshell inserts that may be relatively quickly customized for different circuitry variations. A single ECM 160" may control up to three elevators 50". However, an ECM 160" may control any number of elevators 50*a*"-50*n'* '.

The ECM 160" may include a single board computer 162" (SBC) carried by the housing 161". The SBC 162" may be coupled to an ethernet controller 163" and to general purpose input-output (GPIO) circuitry 164". The GPIO circuitry 164" may include stepper motor (i.e., actuator) drivers 165*a*' '-165*c*", for example, three stepper motor drivers when the ECM 160" is configured to operate three elevators 50" or more particularly, actuators. The GPIO circuitry 164" may be coupled to a I/O port or serial port 170" carried by the housing 161". The GPIO circuitry 164" is coupled to the UAV detectors 85", the cooling arrangement 80", and the charging arrangement 70". The GPIO circuitry 164" may also be coupled to other and/or additional devices, for example, within the field-portable housing, such as, a temperature sensor associated with each elevator 50".

In some embodiments, a cooling fan controller 168" may optionally be included for controlling the cooling arrangement 80". Power circuitry 169" is also carried by the housing 161" and coupled to the ethernet controller 163", the GPIO circuitry 164" and the optional cooling fan controller 168". The power circuitry 169" may include an electromagnetic interference (EMI) filter, and power regulation and distribution circuitry, as will be appreciated by those skilled in the art, and may be accept external power, for example, 12V to 28V.

The ethernet controller 163" may be a 100 Base-T or 1000 Base-T ethernet controller. The ethernet controller 163" is illustratively coupled to an upstream ethernet switch 266", carried outside the housing 161", for example, by an ethernet connector 172" (FIG. 9) carried by the housing. The ethernet switch 266" is coupled to a common compute module 267".

The ECM 160" controls the elevators 50" to deploy, capture, and store one or more of the UAVs. The ECM. 160" also detects and reports the presence of UAVs within the internal chambers. The ECM 160" also accepts generic or future airborne capability environment (FACE) compliant command messages via ethernet (e.g., via the ethernet controller 163"). Status reports and messages may be reported using generic or FACE compliant status messages also via ethernet.

The ECM 160" may alternatively or additionally control the cooling arrangement 80" and the electrical charging arrangement 70" (e.g., via commands to/from the charge controller and/or via ethernet). In embodiments that include a temperature sensor, the ECM 160" may detect temperatures around the UAVs and control or adjust the cooling arrangement 70" accordingly.

Figure 11:
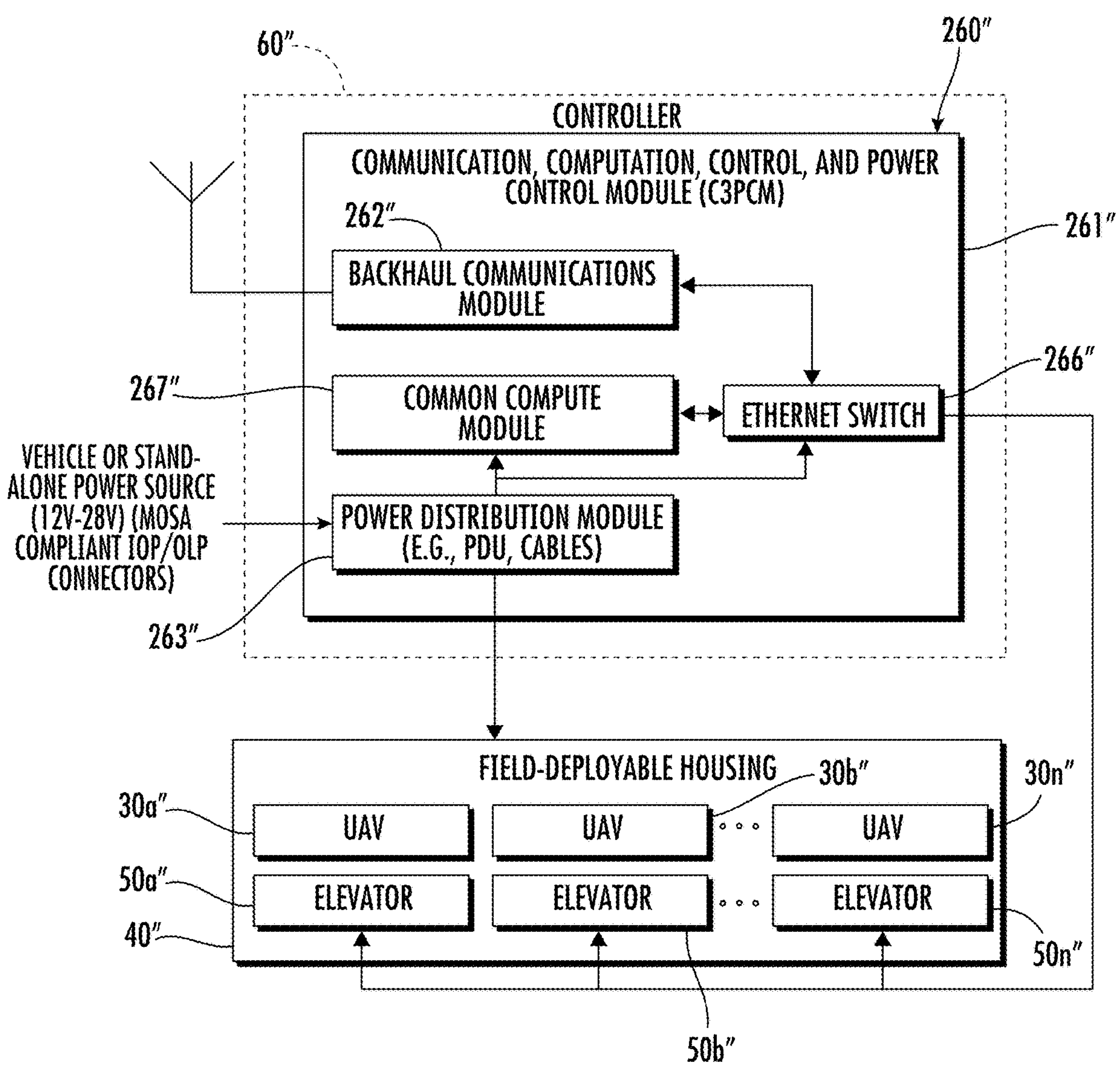
FIG. 11 is a schematic block diagram of a communication, computation, control, and power control module (C3PCM) in accordance with an embodiment.

Referring additionally to FIG. 11, the C3PCM 260" includes a housing 261". A backhaul communications module 262'" is carried by the housing 261". The backhaul communications module 262' may be a wireless backhaul communications module. C3PCM 260" also includes, for example, carried by the housing, the ethernet switch 266" and the common compute module 267". A power distribution module 263", for example, cables and/or a power distribution unit, may also be carried by the housing 261". The power distribution module 263" may accept power, for example, 12V to 28V, from a standalone power supply or vehicle power supply.

As will be appreciated by those skilled in the art the C3PCM 260" may provide a modular payload for communications (e.g., wireless communications to transfer data) and computations (e.g., data management, translation, transfer, modification, FACE compliant, etc.). The C3PCM 260" may also provide a modular payload for control functions (e.g., top system level control of sub systems) and power (e.g., power distribution and management).

In some embodiments, the C3PCM 260" may include a processor, controller, or circuitry, e.g., as part of the compute functions, image and video processing and/or decision making based upon artificial intelligence/machine learning. The C3PCM 260" may also translate commands/status to native UAV system components. For example, the C3PCM 260" may provide commands to deploy, capture, and/or stow one or more of the UAVs 30*a*' '-30*n*' '. The C3PCM 260" may alternatively or additionally, query and report the presence and position of the UAVs 30*a*' '-30*n*" in the internal chambers, query and report temperatures, query and command the charging status of the UAVs and the electrical charging arrangement, query and command the cooling arrangement, and query and report temperatures within the field-portable housing. The above data may be communicated remotely to via the backhaul communications module 262". Remote commands may be received from the backhaul communications module 262'.

A method aspect is directed to a method of operating a plurality of unmanned aerial vehicles (UAVs) 30*a*-30*n*, with each UAV including a body 31 and at least one deployable blade 32 coupled thereto. The method may include storing the plurality of UAVs 30*a*-30*n* in a field-portable housing 40 having a plurality of internal chambers 42 receiving respective ones of a plurality of UAVs therein; and operating a plurality of elevators 50 associated with respective internal chambers within the field-portable housing to move respective UAVs between lowered and raised positions.

The method also includes using a controller 60 carried by the field-portable housing 40 to selectively operate the plurality of elevators 50 for UAV launching and recovery. Using the controller 60 includes using the controller to communicate a desired internal chamber 42 to a respective UAV 30a-30n during UAV recovery, for example. Using the controller 60 includes using a wireless transceiver with the controller to establish remote wireless communication, for example.

The method also includes using an electrical charging arrangement 70 carried by the field-portable housing 40 for charging the plurality of UAVs 30a-30n. The method also includes using a cooling arrangement 80 carried by the field-portable housing 40 for cooling the plurality of UAVs 30a-30n.

As will be appreciated by those skilled in the art, the UAV system 20 may be particularly advantageous for providing a complete package for detecting, lifting/deploying, lowering/stowage, and charging of a vertical or coaxial UAV or drone. Additionally, by including multiple elevators 50 within a single field-portable housing 40 for the UAVs 30a-30n, packaging density may be increased. In-field serviceability may permit replacement of individual elevators 50 or sub-systems.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An unmanned aerial vehicle (UAV) system comprising:

a plurality of UAVs, each UAV comprising a body and at least one deployable propulsion blade coupled to the body to define a vertically-profiled UAV;

a field-portable housing having a plurality of internal chambers receiving respective UAVs in the plurality of internal chambers;

a plurality of tubular silos carried by the field-portable housing and defining the plurality of internal chambers, each tubular silo sized to receive a corresponding vertically-profiled UAV therein with the at least one deployable propulsion blade retracted; and a plurality of elevators each carried within a corresponding one of the plurality of tubular silos and each elevator configured to move a respective vertically-profiled UAV between lowered and raised positions within the corresponding tubular silo with the at least one deployable propulsion blade retracted.

2. The UAV system of claim 1 comprising a controller carried by the field-portable housing to selectively operate the plurality of elevators for vertically-profiled UAV launching and recovery.

3. The UAV system of claim 2 wherein the controller is configured to communicate a desired tubular silo to a respective vertically-profiled UAV during vertically-profiled UAV recovery.

4. The UAV system of claim 2 comprising a wireless transceiver; wherein the controller is configured to cooperate with the wireless transceiver for remote wireless communication.

5. The UAV system of claim 1 comprising an electrical charging arrangement carried by the field-portable housing for charging the plurality of vertically-profiled UAVs.

6. The UAV system of claim 1 comprising a cooling arrangement carried by the field-portable housing for cooling the plurality of vertically-profiled UAVs.

7. The UAV system of claim 1 comprising a plurality of vertically-profiled UAV presence detectors, each associated with a respective tubular silo.

8. The UAV system of claim 1 wherein each elevator comprises:

a rail;

a capture cup movable along the rail and for receiving a respective vertically-profiled UAV; and an actuator for moving the capture cup along the rail.

9. An unmanned aerial vehicle (UAV) system comprising:

a field-portable housing having a plurality of internal chambers receiving respective ones of a plurality of UAVs in the plurality of internal chambers, each UAV comprising a body and at least one deployable propulsion blade coupled to the body to define a vertically-profiled UAV;

a plurality of tubular silos carried by the field-portable housing and defining the plurality of internal chambers, each tubular silo sized to receive a corresponding vertically-profiled UAV therein with the at least one deployable propulsion blade retracted; and a plurality of elevators carried within a corresponding one of the plurality of tubular silos and each elevator configured to move a respective vertically-profiled UAV between lowered and raised positions within the corresponding tubular silo with the at least one deployable propulsion blade retracted.

10. The UAV system of claim 9 comprising a controller carried by the field-portable housing to selectively operate the plurality of elevators for vertically-profiled UAV launching and recovery.

11. The UAV system of claim 9 comprising an electrical charging arrangement carried by the field-portable housing for charging the plurality of vertically-profiled UAVs.

12. The UAV system of claim 9 comprising a cooling arrangement carried by the field-portable housing for cooling the plurality of vertically-profiled UAVs.

13. The UAV system of claim 9 comprising a plurality of vertically-profiled UAV presence detectors, each associated with a respective tubular silo.

14. The UAV system of claim 9 wherein each elevator comprises:

a rail;

a capture cup movable along the rail and for receiving a respective vertically-profiled UAV; and an actuator for moving the capture cup along the rail.

15. A method of operating a plurality of unmanned aerial vehicles (UAVs), each UAV comprising a body and at least one deployable propulsion blade coupled to the body to define a vertically-profiled UAV, the method comprising:

storing the plurality of vertically-profiled UAVs in a plurality of tubular silos carried by a field-portable housing having a plurality of internal chambers defined by the plurality of tubular silos and receiving respective ones of a plurality of UAVs in the plurality of internal chambers, each tubular silo sized to receive a corresponding vertically-profiled UAV therein with the at least one deployable propulsion blade retracted; and operating a plurality of elevators each associated with a corresponding one of the plurality of tubular silos to move respective vertically-profiled UAVs between lowered and raised positions within the corresponding tubular silo with the at least one deployable propulsion blade retracted.

16. The method of claim 15 comprising using a controller carried by the field-portable housing to selectively operate the plurality of elevators for vertically-profiled UAV launching and recovery.

17. The method of claim 16 wherein using the controller comprises using the controller to communicate a desired tubular silo to a respective vertically-profiled UAV during vertically-profiled UAV recovery.

18. The method of claim 16 comprising using a wireless transceiver cooperating with the controller for remote wireless communication.

19. The method of claim 15 comprising using an electrical charging arrangement carried by the field-portable housing for charging the plurality of vertically-profiled UAVs.

20. The method of claim 15 comprising using a cooling arrangement carried by the field-portable housing for cooling the plurality of vertically-profiled UAVs.

* * * * *